Feb. 21, 1933.  S. GRAHAM  1,898,179
AERIAL PHOTOGRAPHY
Filed Feb. 28, 1929   5 Sheets-Sheet 1

Inventor:
Stuart Graham
By his attorneys:
Hoguet & Neary

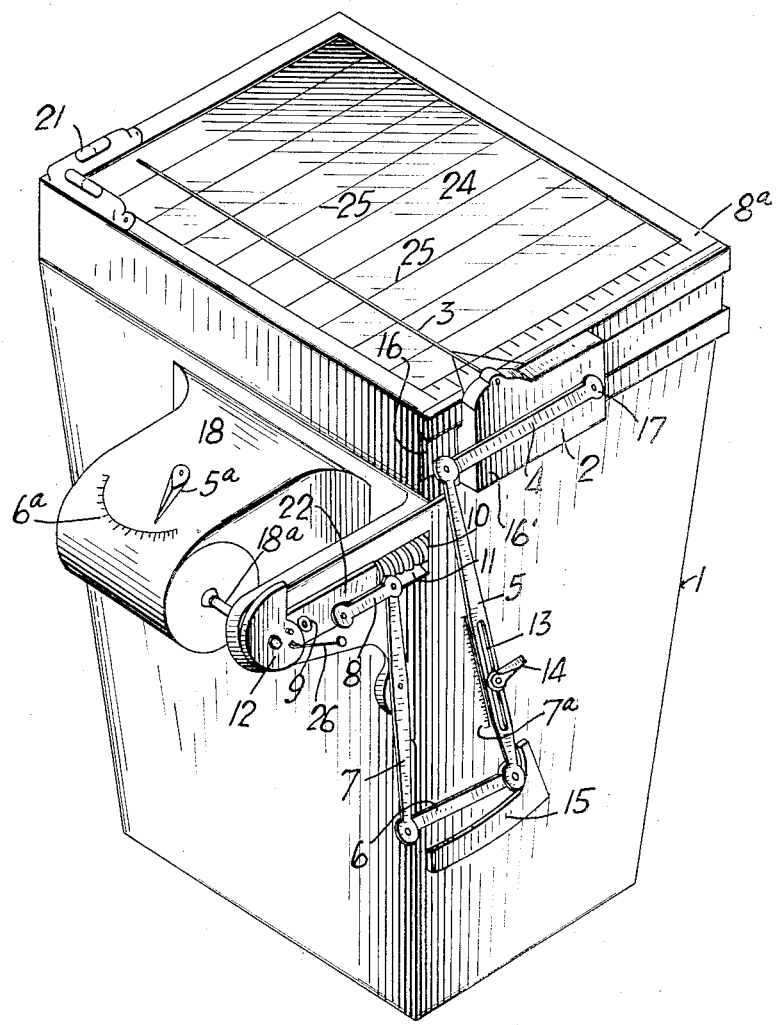

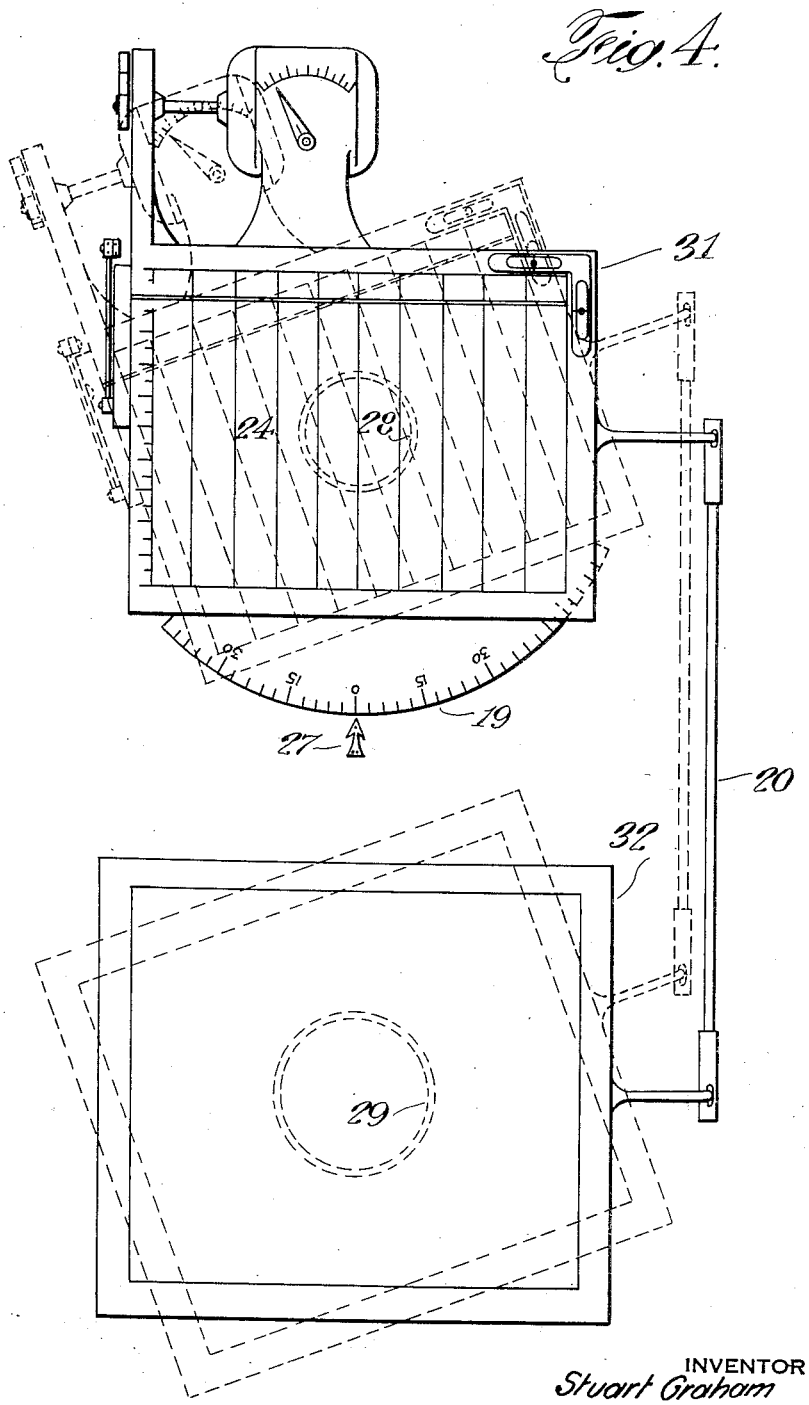

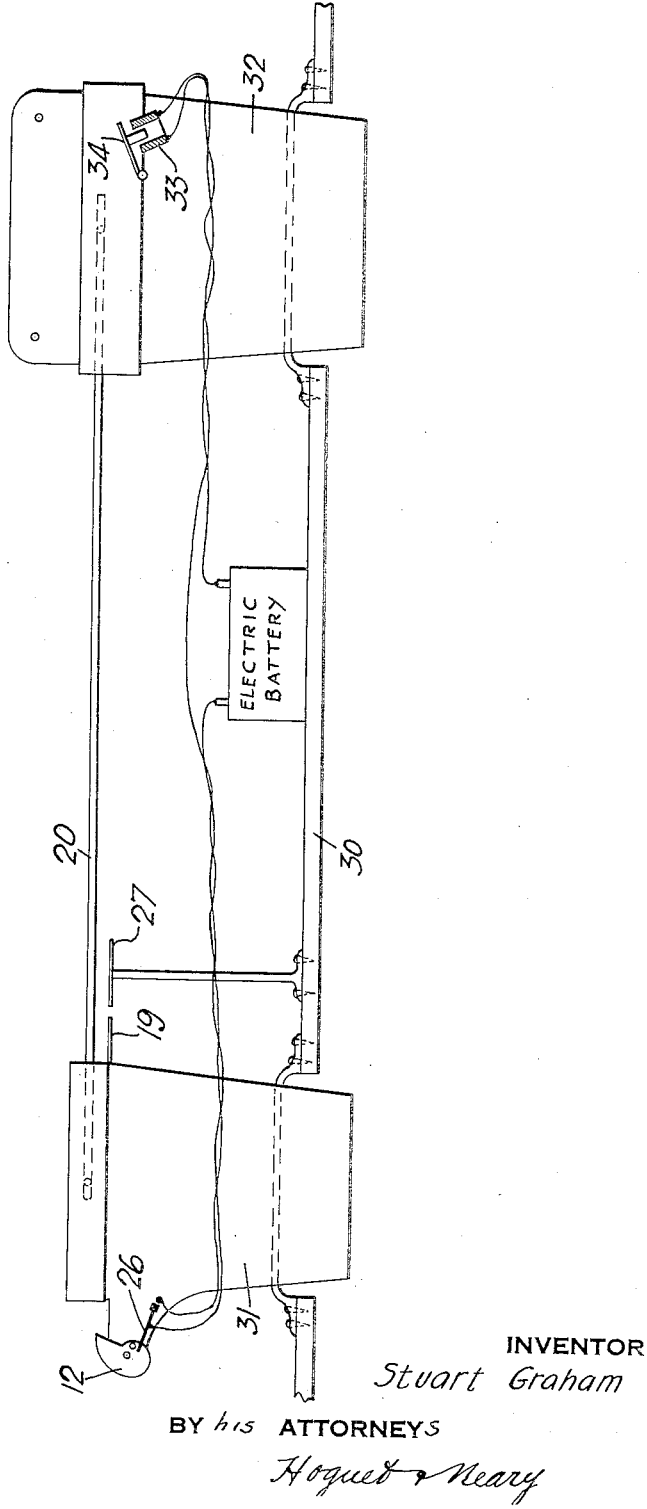

Patented Feb. 21, 1933

1,898,179

UNITED STATES PATENT OFFICE

STUART GRAHAM, OF OTTAWA, ONTARIO, CANADA

AERIAL PHOTOGRAPHY

Application filed February 28, 1929, Serial No. 343,518, and in Canada March 16, 1928.

This invention relates to improvements in aerial photography, and the objects of the invention are to provide a simply constructed, durable and light apparatus for more efficiently making vertical aerial photographs.

A further object is to provide improved means in the form of a track and interval meter for use with aircraft cameras, particularly adapted to vertical photographic mapping work.

The invention consists in a method and apparatus whereby any desired overlapping of terrain shown on consecutive photographic exposures made with a camera may be consistently secured.

The invention further comprises the combination with an aircraft camera and lens of a member movable across the plane of the image reproduced by the lens, of means for synchronizing the speed of the movable member with the visible movement of the image across the lens, means for causing the movable member to trip at a predetermined point in its travel and to return to normal zero position, and means for simultaneously operating the exposure lever of the camera.

Referring now to the drawings in which like characters of reference indicate corresponding parts in each figure:

Figure 3 is a projected view of the device.

Figure 4 is a plan view of the device showing its plan of operation in dotted lines.

Figure 5 is a view in elevation, somewhat diagrammatical, showing the means for controlling the operation of the camera shutter in synchronism with the action of the movable member of the view finder.

Figure 1:
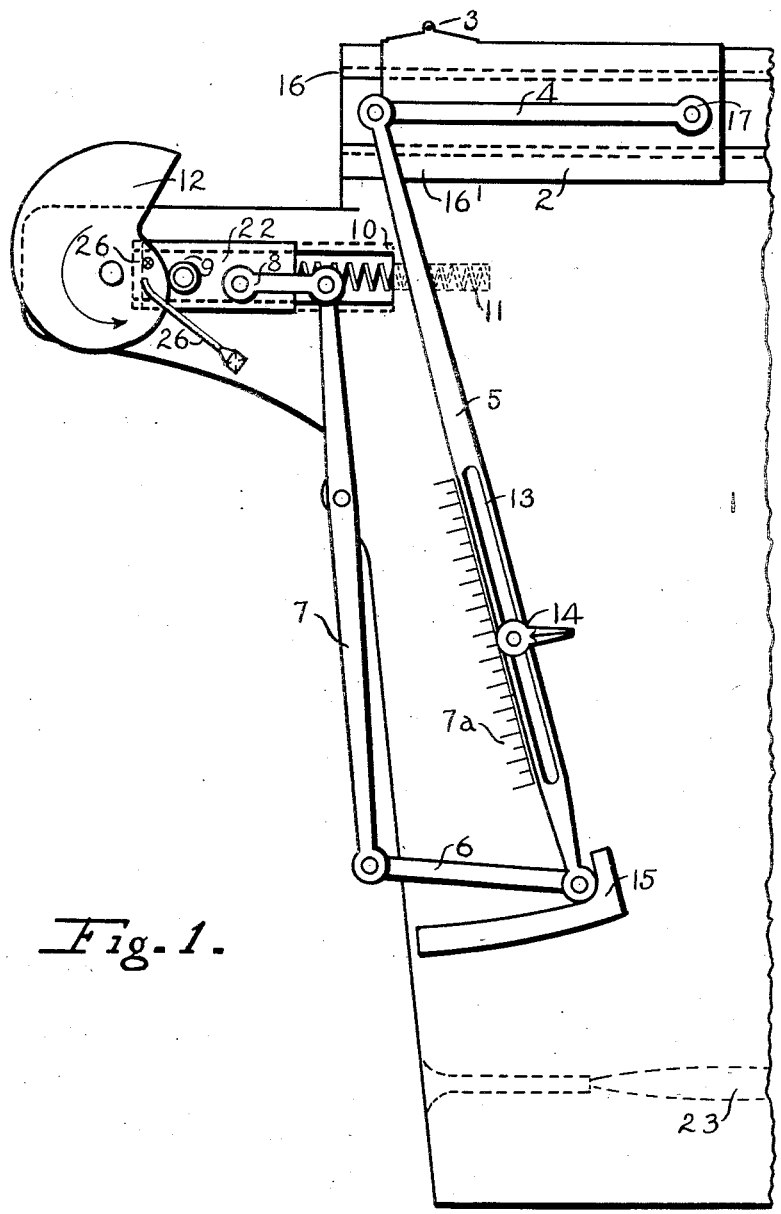
Figure 1 is a side elevation of the device.
Figure 2:
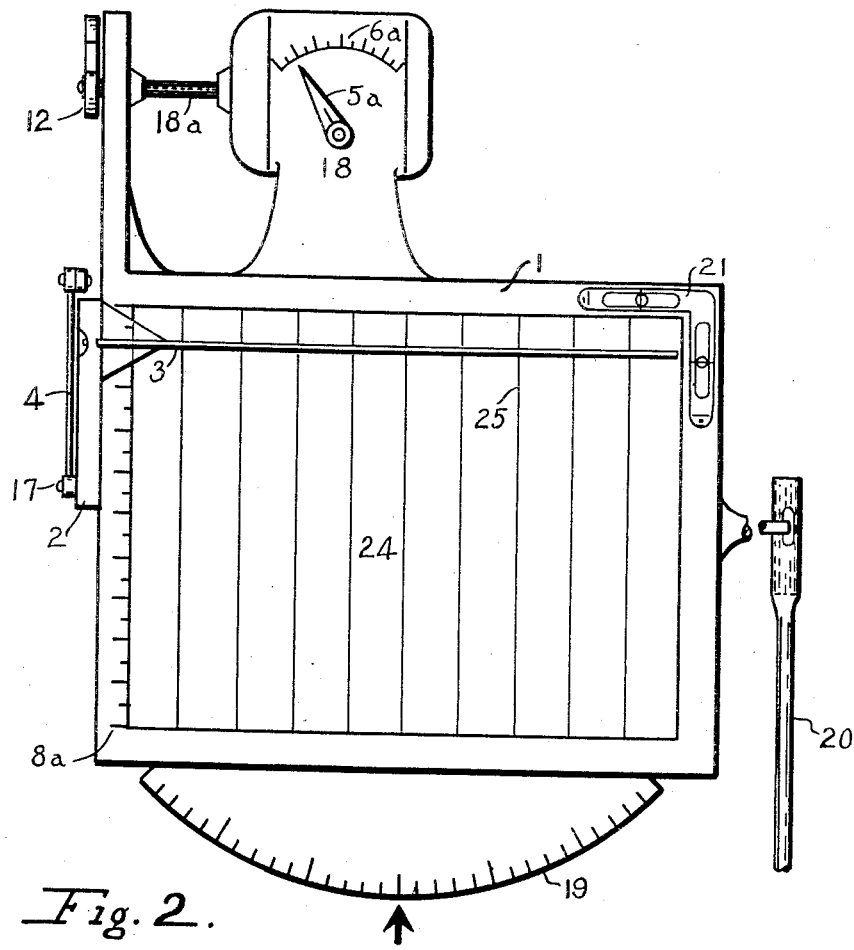
Figure 2 is a plan view of the device.

Referring now more particularly to the drawings in which an example of my invention is disclosed, I employ a camera 32 which may be fully automatic in its operation with the exception that the tripping of the camera shutter 34 is under the control of the interval meter or view finder generally referred to by the reference character 31. The camera may be of the Fairchild type K—3 as fully disclosed in the U. S. patent to Sherman M. Fairchild No. 1,612,860, patented January 4, 1927, in which the tripping of the shutter brings into play such mechanism as is necessary to advance unexposed film and resets the shutter for a subsequent exposure. In Figures 1, 2 and 3 I have shown a cone-shaped box or casing 1 adapted to be supported in any suitable manner in an aircraft. In the lower end of the box is a photographic lens 23, superimposed on which, in the upper portion of the casing is a ground-glass 24 in the focal plane, the whole being mounted vertically.

An image of the terrain appears on the ground-glass 24 and will move across said glass, as indicated by the etched lines 25, as the air craft travels. Suitably mounted on the casing is a prime mover 18 on the shaft 18a of which is rigidly mounted a cam 12, the prime mover being definitely controlled by the operator, provided with a lever 5a and scale 6a. Connected to the cam is a follower 9 and a slide 22 travelling in a guideway or groove 10 and spring pressed by means of coil spring 11 between the end of the slide and the end of the groove 10.

Connected to the slide is a compound lever member comprising a link arm 8 pivotally connected to a pivotally mounted arm 7, in turn pivotally connected to a lever arm 6, pivotally connected to a slotted lever arm 5, the end of which is pivotally connected to an arm 4, in turn connected to a pin 17 on a second slide 2 travelling in guideways 16 formed in the wall of the casing 1. A scale 8a is also associated with the ground glass 24, the purpose of which is hereinafter more fully referred to. Associated with the compound lever and more particularly with the slotted arm 5 thereof is a scale 7a cooperating with the scale 8a and adapted for use with the fulcrum adjuster 14 whereby the travel of the slide 2 is controlled, the member 14 being adapted to set the lever arm 5 to cause the slide 2 to be automatically tripped on reaching a predetermined point in its travel across and parallel with the ground glass 24.

This fulcrum adjuster 14 is movable in the slot 13 and a registering slot not shown, the lever arm 5 being supported by the hand or in any other suitable manner while being adjusted. Cooperating with the slide 2 and mounted adjustably at one end is a transversely extending member 3 of any suitable construction and here shown in the form of a wire, which, on the slide 2 moving will travel across the ground glass 24 and the speed of such travel synchronizing with the speed of the image of the terrain below travelling across said glass.

From the foregoing it will be seen that when the prime mover 18 is set to cooperate with the speed at which the aircraft is travelling and then started, the cam 12 will be rotated to move the follower 9 and slide 22 forwardly operating the compound lever with the fulcrum adjuster also set and through which the slide 2 and the cross member 3 move across the ground glass 24. Then as the cam 12 continues to rotate, the inner end 16¹ of the slide 2 carrying the member 3 will reach the predetermined point of the travel on the scale 8a and the mechanism having been, as previously mentioned, set to this point, the spring 11 will automatically operate to shoot the slide 22 and follower 9 backwardly to position shown in Fig. 3 and with them the slide 2 and member 3 to their original zero position on the edge of the ground glass or image 24.

It will thus be seen that the speed of the member 3 across the lens will synchronize with the visible movement of the image of the terrain thereacross and that at a predetermined point the member 3 will automatically, through the tripping of the mechanism operating it, return to normal zero position, thus consistently securing any desired overlapping of terrain shown on consecutive photographic exposures.

The interval meter 31, and camera 32 are suitably supported over floor 30 of aircraft (see Figure 4) and exposed respectively through the holes 28 and 29 in the aircraft floor. The interval meter 31, and the camera 30 are so mounted that any rotational movement of the interval meter is imparted to the camera in the same plane, through the medium of the hinged link 20. The graduated sector 19 is attached to the outer portion of the interval meter 31, and in conjunction with the lubber point 27 attached to the floor of the aircraft, the drift of the aircraft caused by the wind can be measured in degrees on the sector 19. The sector 19 is shown opposite the arrow or pointer 27 and referring to Figures 4 and 5 it will be seen that it is rigidly attached to the floor or other suitable part of the aircraft.

Electrical contacts 26 are provided on the cam 12 and on the frame 1 (see Fig. 1) so that in each complete turn of the cam 12 and when the cross member 3 is in its most advanced position, these contacts will engage with one another to close the circuit in which is a solenoid operating the shutter of a camera with which the device is used. Cross levels 21 enable the operator to keep the device level in the horizontal plane during operations. The graduated sector 19 is rigidly attached to the outer portion of the frame 1 for measuring the angle of drift of the aircraft as shown by the image moving across the image plane or ground glass 24, and this drift angle may be directly read in degrees, opposite the indicating pointer 27 which latter is rigidly fixed to the floor 30 or frame of the aircraft. The camera 32 is connected to the view finder by means of a link 20 and is so placed that any rotational movement of the view finder in a horizontal plane will be imparted equally to the camera in the same plane to align it with the true path of the aircraft as indicated by the movement of the terrain image across the ground glass.

With the photographic lens placed in the lower end of the box and surmounted by the ground glass 24 in the focal plane, a light shield may be preferably used over the ground glass.

More specifically the complete operation is as follows: The occupant of the aircraft in mapping the terrain will, as the aircraft is travelling, keep looking down through the ground glass 24, and will rotate the interval meter until the image of the terrain below travels parallel to the etched lines 25, and such rotation of the interval meter will cause a similar rotation of the camera through the medium of the hinged link 20. The operator will keep his hand on the control lever 5ᵃ of the prime mover which has previously been started and in this way, he will synchronize the speed of the movable member 3 with the speed of the image of the terrain passing across his line of vision.

It should also be noted that the example of the apparatus here disclosed can be used for other purposes, in connection with measurement of wind velocity, etc.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. An apparatus for securing aerial photographs having a predetermined amount of overlap, comprising in combination an aerial camera with a shutter tripping device and a view finder, said view finder including a casing and a lens therein and a ground glass in the focal plane of the lens, a movable member extending across the ground glass, a prime mover for moving said member and for operating said camera shutter tripping device, means for adjusting the speed of travel of said member and with the aid of visual observation of the image of the terrain for synchronizing the apparent speed of travel thereof with that of said movable member, means for limiting the extent of travel of said movable member and for automatically returning the same to normal position after it has reached a predetermined point in its travel, means operated by the moving parts of said view finder for intermittently effecting an operation by said prime mover of said camera shutter tripping device so as to effect a synchronism of operation between the camera and view finder.

2. An apparatus of the character described for securing an overlapping of terrain in consecutive exposures including a camera with a shutter tripping device, a view finder comprising a casing with a lens and a ground glass for visually observing the image of points on the earth's terrain, a prime mover for operating said view finder and said camera shutter tripping device, a movable member extending across said ground glass, a cam member carried by said view finder and adapted to be rotated by said prime mover, a spring pressed slidable member operated by said cam, a second slidable member rigidly connected to said movable member and compound lever means pivotally connected to the second slidable member and the first mentioned slidable member whereby upon the cam member being operated the movable member is caused to travel across the ground glass, an adjustment means for causing said spring pressed slidable member to be automatically tripped and returned to normal position after a predetermined point in its travel so as to return said movable member to normal zero position, said view finder being adapted to be continuously operated by said prime mover, and means controlled by the operation of said view finder mechanism for connecting the shutter tripping device with said prime mover so as to cause said camera to be intermittently operated in synchronism with the operation of said view finder.

3. An apparatus for securing aerial photographs having a predetermined amount of overlap comprising in combination with a self driven aerial camera, a box, a lens in the box and a ground glass in the focal plane of the lens, a single reciprocatory movable cross wire extending across the ground glass, adjustable means for operating the cross wire for prescribing its limits and speed of travel and for synchronizing the speed of travel of said cross wire with the speed of travel of the image of the terrain across the ground glass and for automatically returning the cross wire to normal zero position at a predetermined point in its travel, said means comprising in combination a spring actuated operating mechanism for said movable member, a fulcrum adjuster associated with a compound lever and a scale for said movable member and for said fulcrum adjuster whereby the stroke of said compound lever may be adjusted to limit the travel of said cross wire, a camera shutter tripping circuit and means actuated by the movement of said lever for causing the circuit to trip the shutter of said camera upon the completion of the forward movement of said cross wire.

4. In a view finder for a self driven aerial camera, a view finder having a driven and spring returned movable element, a driven camera shutter tripping circuit closing device adapted to operate synchronously with said element, means for adjusting the operation of said device and said movable element so as to be synchronous with the apparent movement of the images of the objects of the terrain, said device being adapted to cause the tripping of the shutter upon each complete cycle of operation of the movable element, and means for adjusting the limits of movement of said movable element.

5. An apparatus for securing an overlap of terrain shown on consecutive photographic exposures comprising a self driven aerial camera, means for indicating an image of terrain below a reciprocatory member movable across the indicating means, a prime mover and driving units driven thereby for operating the movable member, means for adjusting the limits of travel of said member and for adjusting so as to make it possible to synchronize the speed of travel of such member with an image moving across the indicating means, said adjustment means being adapted to automatically cause the movable member at a predetermined point in its travel to return to normal position, and suitable means associated with said driving units and with the camera for simultaneously tripping the shutter of said camera and returning the movable member to normal position.

6. In combination, a self driven aerial camera, a prime mover, a lens, a reciprocatory member movable over the range of vision through said lens, means operated by the prime mover for driving said member and adjustable to vary the speed and limits of travel of the movable member and a shutter tripping device adapted to be operated by said means, said means being adapted upon the reaching by said member of a predetermined point in such travel to cause the operation of said shutter tripping device and to return said member to normal zero position.

In testimony whereof, I have signed my name to this specification this eighteenth day of February, 1929.

STUART GRAHAM.